United States Patent

[11] 3,589,674

| [72] | Inventor | Marvin R. Jones<br>Houston, Tex. |
|---|---|---|
| [21] | Appl. No. | 835,622 |
| [22] | Filed | June 23, 1969 |
| [45] | Patented | June 29, 1971 |
| [73] | Assignee | Cameron Iron Works, Inc.<br>Houston, Tex.<br>Continuation of application Ser. No.<br>616,630, Feb. 16, 1967. |

[54] VALVES
12 Claims, 5 Drawing Figs.

[52] U.S. Cl. ................................................ 251/151,
251/315, 251/317, 251/358, 251/363
[51] Int. Cl. ................................................ F16k 5/06
[50] Field of Search ........................................ 251/315,
316, 317, 151

[56] References Cited
UNITED STATES PATENTS

| 2,868,498 | 1/1959 | Kaiser | 251/315 X |
| 2,985,421 | 5/1961 | Anderson | 251/363 X |
| 3,228,652 | 1/1966 | Autrim | 251/315 X |
| 3,405,909 | 10/1968 | Scaramucci | 251/317 X |

*Primary Examiner*—Harold W. Weakley
*Attorney*—Hyer, Eickenroht, Thompson & Turner ABSTRACT: A valve comprising a first body connectable as a relatively permanent part of a conduit with its flowway forming a continuation of the conduit, and a second body removably held by a readily releasable and non-load-carrying member within an opening in the first body which extends laterally across the flowway. An opening through the second body extends concentrically of the flowway, and a closure member is supported by the second body within the opening for opening and closing the flowway. Seats are carried within the second body opening on opposite sides of the closure member to seal with the sides of the first body opening, the second body opening and the closure member when in flowway-closing position.

Marvin R. Jones
INVENTOR

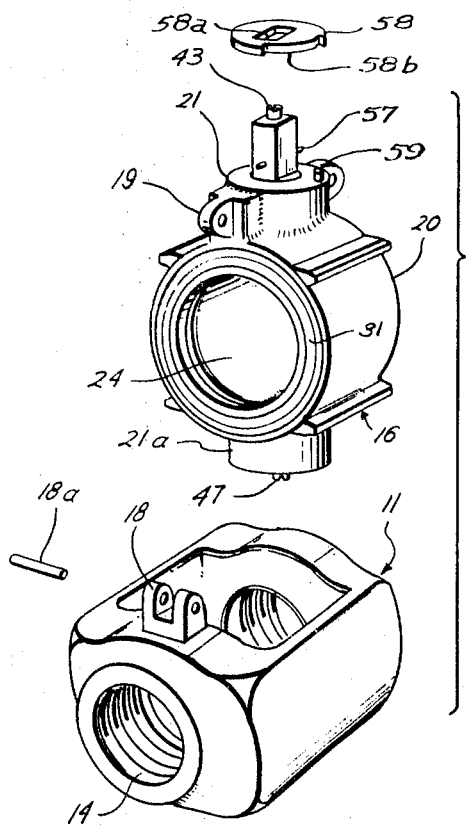
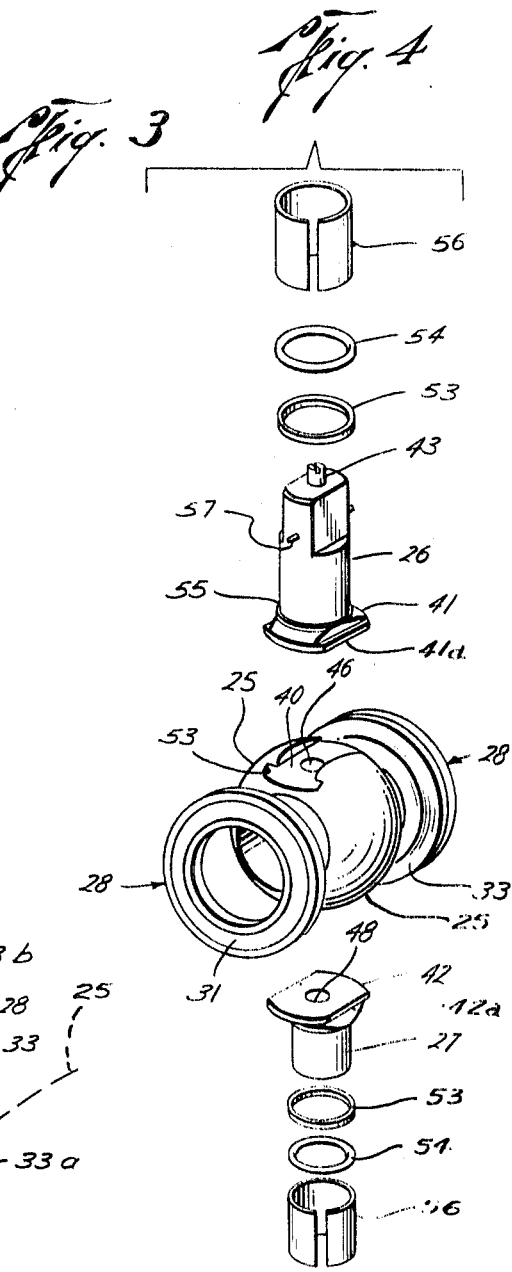
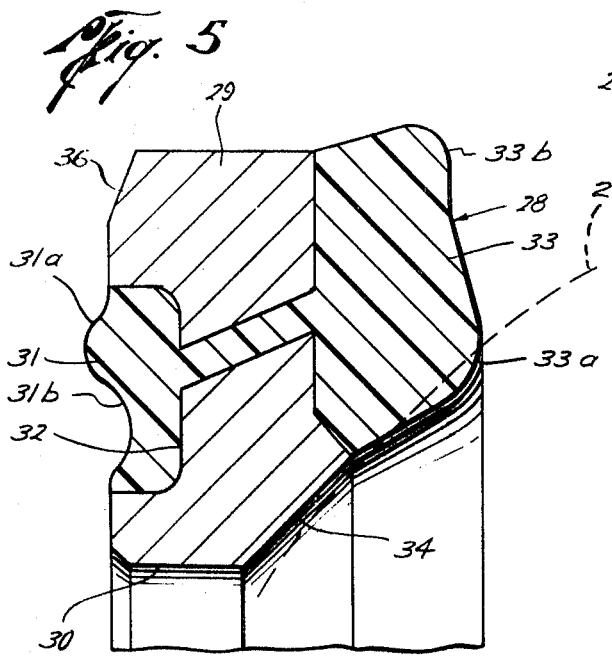

VALVES

This application is a continuation of Ser. No. 616,630, filed Feb. 16, 1967, and entitled "Valves."

This invention relates to valves, and, more particularly, to improvements in valves of the type in which a first body is connected in a conduit as a relatively permanent part thereof, and a second body carrying the closure member and the expendable parts of the valve is removably held within the first body by means of a readily releasable and non-load-carrying connection.

In this type of valve, the opening in which the second body is held extends laterally across the flowway and is of substantially uniform cross-sectional area from one end to the other. With the seats carried by the second body sealably engaged with these sides of such opening, the second body is pressure balanced, so that it need not be connected to the first body by the usual load-carrying bolts. In order to replace the expendable parts, such as the seats and particularly the seal rings on them, it is merely necessary to release the non-load-carrying connection of the second body to the first body, which may comprise a single pin, and remove the second body from the opening through the first body.

However, one of the shortcomings of prior valves of this type is the great amount of energy required to move the closure member between opened and closed positions. Another problem is the tendency for the seal ring between each seat and the sides of the opening through the first body to be extruded out between the first and second bodies.

In a gate valve of this type, the gate is free to slide between the seats during its assembly and disassembly. Obviously, this would not be possible in a ball valve of this type in which the ball is captured by the seats. Furthermore, if the second body is to be of integral construction, the ball must be separable from its stem or stems to permit its assembly and disassembly.

An object of this invention is to provide a valve of this type which requires only a small amount of work to operate it and in which there is little likelihood of the seal ring being extruded between the first and second bodies.

A further object is to provide a valve seat which is particularly well suited for use in a ball valve having the attributes set forth in the previous object.

Still another object is to provide a subassembly including a ball and separable stems which is particularly well suited for use with such a ball valve.

Yet a further object is to provide a ball valve of the character above-described which is simple and inexpensive to construct, repair and maintain.

In the drawings, wherein like reference characters are used throughout to designate like parts:

FIG. 3 is a perspective view of the valve of FIGS. 1 and 2, but with the first body separated from the conduit and the second body removed from within the first body;

FIG. 4 is an exploded perspective view of the ball, stems and seats removed from within the second body; and FIG. 5 is an enlarged cross-sectional view of one of the seats.

Figure 1:
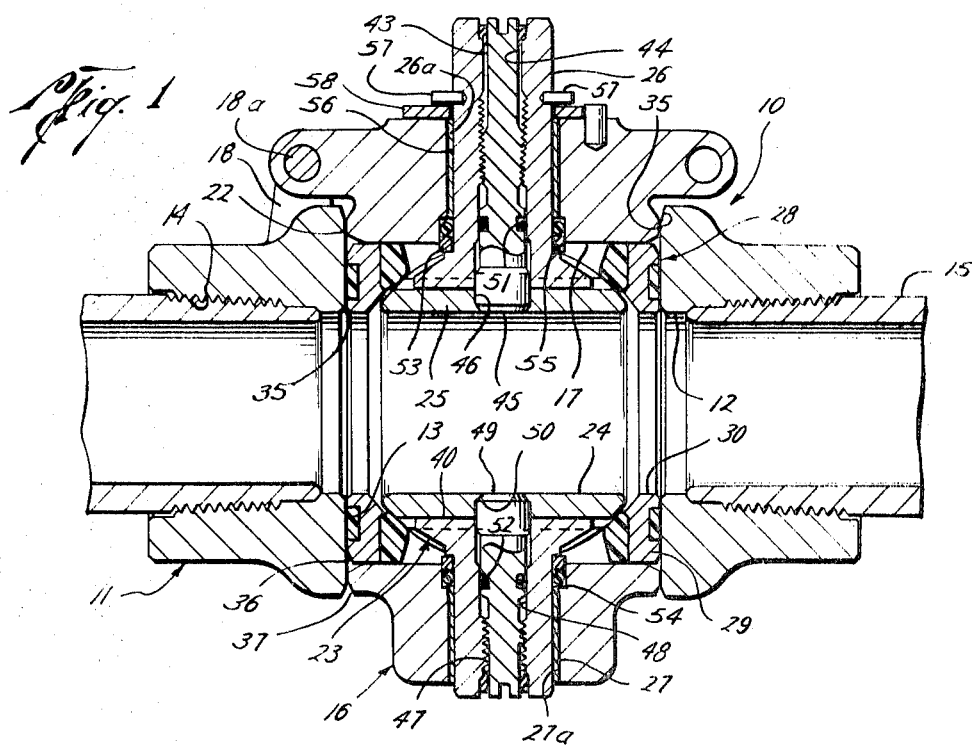
FIG. 1 is a longitudinal sectional view of a ball valve constructed in accordance with the present invention, and connected in a conduit, and with the closure member thereof in open position.
Figure 2:
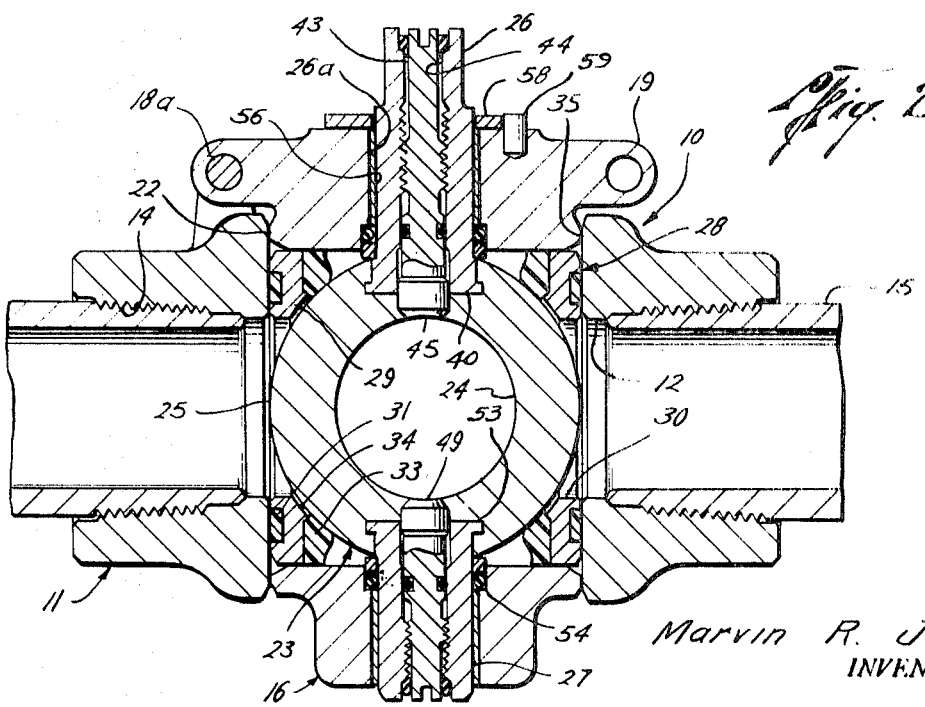
FIG. 2 is a view similar to FIG. 1, but with the closure member in closed position.

With reference now to the details of the drawings, and particularly FIGS. 1 and 2, the overall valve, which is indicated in its entirety by reference character 10, included a first body 11 having a flowway 12 extending longitudinally through it and an opening 13 extending laterally through it and across the flowway. The opposite ends of the flowway 12 are threaded at 14 for relatively permanent connection in a conduit 15.

The valve 10 includes a second body 16 removably insertable into the first body opening 13 and having a cylindrical opening 17 extending through it. More particularly, the second body is held within the first body opening to align the axis of its opening 17 with the axis of the flowway 12. As best shown in FIG. 3, the opening 13 is rectangular and of uniform cross-sectional area from one end to the other. Thus, the opposite sides of this opening which surround the flowway are parallel to one another so that, as will be described to follow, when the second body 16 including the closure member and seats carried thereby is slidably inserted into and held within opening 13, it is pressure balanced in a direction parallel to the axis of said opening. Thus, as in prior valves of this type, the second body 16 need only be held against gravitational forces, and does not require the usual load-carrying bolts for connecting it to the first body 11.

In the illustrated embodiment of the invention, this means for holding the second body comprises a pair of spaced-apart ears 18 on the first body adjacent one side of one end of the opening 13 through the body (although ears obviously may be on both ends of the opening), and a lug 19 on each side of one end of the second body for selective reception between the spaced ears 18, depending on the side-for-side orientation of the second body relative to the first body. That is, as will be apparent from the description to follow, the second body is symmetrical side-for-side, so that it may be inserted into the opening 13 with either of its sides adjacent the side on which the ears 18 are disposed. Each lug has a hole therein which is aligned with holes in the ears when the lug is received therebetween, so that a pin 18a may be inserted through the holes to hold the second body in the proper position within opening 13.

As shown in FIG. 3, the second body 16 includes a substantially tubular midportion 20 having bearings 21 and 21a extending radially from its opposite sides, and the lugs 19 extend from opposite sides of the bearing 21. When the second body is held within the opening 13, annular faces 22 on each side of its midportion 20 are disposed opposite and closely adjacent the opposite sides of the opening 13 surrounding its intersection with flowway 12.

As best shown in FIGS. 1 and 2, the opening 17 through the second body 16 is sufficiently larger than the flowway 12 through the first body 11 to receive a closure member 23 having a port 24 of substantially the same diameter as such flowway, thereby providing a full opening through the valve in the open position thereof shown in FIG. 1. Then, of course, when the closure member 23 is turned 90°, a solid portion thereof is across the flowway to close same, as shown in FIG. 2.

The closure member 23 includes a ball 25 through which the port 24 is formed and upper and lower stems 26 and 27 extending from the ball on opposite sides of the port. More particularly, the upper stem 26 shown in FIGS. 1 and 2, extends through opening 26a in bearing 21, and the lower stem 27 extends through opening 27a in the bearing 21a.

As shown in FIGS. 1 and 2, a seat 28 is carried within the second body opening 17 between each side of the ball of the closure member 23 and the adjacent side of opening 13. More particularly, each seat 28 includes a relatively rigid core in the form of a metal ring 29 which is somewhat thinner than the spacing between the opposite sides of the ball 25 and the sides of the opening 13. Thus, with line pressure urging the seats away from the ball, as will be described to follow, and the ball supported by the stems 26 and 27, the metal rings and the ball are spaced apart during rotation of the closure member so as to reduce the torque requirements to a minimum.

As can also be seen from FIGS. 1 and 2, the outer diameter of the metal ring 29 approximates the inner diameter of opening 17 through the second body 16 so that it fits relatively closely therein and is held concentrically about the port 24 through the ball in its open position. Also, in this preferred structure, the port 30 through each ring 29 is of the same diameter as the port 24 so as to form a continuation of the full opening through the valve.

Each metal ring 29 carries means for sealing between it and the adjacent side of the opening 13, the cylindrical opening 17 through the second body 16, and the adjacent side of the solid portion of ball 25 when in closed position, as shown in FIG. 2. The means for sealing between the metal ring and the opening 13 comprises a ring 31 of resilient sealing material carried within a groove 32 on the flat outer side of the metal ring 29. As shown in FIG. 5, this seal ring 31 includes an outer portion 31a protruding from the groove 32 and an inner portion 31b recessed therein, the volume of the protruding portion 31a being somewhat larger than that of recessed portion 31b so as to insure a seal with the adjacent side of opening 13.

The remainder of the sealing means of each seat comprises a second ring 33 of resilient sealing material carried on the flat radially outer portion of the inner side of the metal ring 29. Preferably, and as shown in FIG. 5, the seal rings 31 and 33 are connected to one another by rods of resilient material extending through passages spaced circumferentially around the metal ring, and the rings and rods are molded to the metal ring. As also shown in FIG. 5, the seal ring 33 has radially inner and outer lips 33a and 33b which face away from the metal ring 29. The outer lip 33b protrudes from the outer diameter of the metal ring 29 so as to form an interference seal with the opening 17 when mounted therein and thus cooperate with seal ring 31 to contain line pressure within the valve. The inner lip 33a protrudes from a conical surface 34 on the radially inner portion of the inner side of the metal ring 29, so as to form a one-way interference seal with the adjacent spherical surface of the ball 25 in the closed position of FIG. 2. Thus, while line pressure is free to move past the inner lip 33a on the upstream side of the ball, it is contained by the inner lip of the seal ring 33 on the downstream side thereof.

Since the effective pressure area across or subtended by the seal ring 33 is greater than that across or subtended by the seal ring 31, line pressure urges each seat 28 outwardly toward the adjacent side of opening 13. Consequently, and as previously noted, the conical surface 34 of the metal ring 29 is kept spaced from the outer spherical surface of the ball 25. In addition to lowering to a minimum the work required to operate the valve, this outward urging of the seats also reduces the clearance between the outer sides of the metal ring 29 and the adjacent sides of the opening 13 through which the seal ring 31 between the metal ring and sides might otherwise be extruded.

As shown in FIGS. 1 and 2, the upper and lower ends of opening 13, as well as the intersections of said opening with flowway 12, are chamfered at 35 so as to facilitate insertion of the second body 16 and the seats carried thereby into either end of the opening 13. More particularly, the radially outer portions of the outer sides of the metal rings 29 are chamfered at 36 and the radially outer portions of the annular faces 22 of the second body are chamfered at 37 for sliding over the chamfers 35 as the second body moves into the opening 13.

In the illustrated embodiment of the invention, the annular portion 20 of the second body 16 is integral so that, as previously mentioned, the stems 26 and 27 must be releasably connected to the ball 25 in order to permit assembly and disassembly of the closure member within such second body. For this purpose, there is a longitudinal groove 40 in each side of the ball within which flanges 41 and 42 on the inner ends of stems 26 and 27, respectively, are slidably engageable.

More particularly, each stem carries means for releasably holding its flange in a fixed position longitudinally within its groove. Thus, as shown in FIG. 1, a pin 43 is threadedly connected within an axial bore 44 through the stem 26 so as to permit its inner end 45 to be moved into and out of a hole 46 extending radially inwardly from a central portion of the groove 40. A similar pin 47 is threadedly connected within an axial bore 48 of the stem 27 to permit its inner end 49 to be moved into and out of a hole 50 extending inwardly from the bottom side of ball 25.

The outer ends of the pins 43 and 49 are slotted or otherwise formed to permit their rotation by a suitable tool, and the inner ends of the holes 46 and 50 are chamfered slightly so as to limit the inward movement of each of the pins 43 and 47. An O-ring 51 surrounds the pin 43 for sealing with respect to the bore 44, and a similar O-ring 52 surrounds the pin 47 within the bore 48.

Each groove 40 extends in a direction parallel to the axis of the port 24, so that when the port 24 is positioned to close the valve, as shown in FIG. 2, the sides of the grooves and flanges are disposed perpendicularly to the flowway 12. In this way, the load due to line fluid acting over the closed ball is distributed over a large area of the stem, rather than over the relatively small area of the pins 43 and 47. Also, each groove 40 is undercut as indicated at 53a to form a T-slot for receiving portions 41a and 42a of the flanges 41 and 42 which overhang the sides of the stems 26 and 27, respectively.

Each stem 26 and 27 is sealed with respect to that its bearing opening through which it extends by means of an O-ring 54 surrounding the stem outwardly of a metal ring 53 thereabout. More particularly, the inner end of each bearing opening 26a and 27a is enlarged to receive the rings 54 and 53 between the annular shoulder on the outer end of the enlarged portion of the bearing opening and an annular shoulder 55 about the stem adjacent its intersection with the flange thereon.

The rings 53 and 54 need carry no thrust from the stems due to line pressure, because the flanges on the inner ends of the stems are held by means of the undercuts of the groove 40 on the ball 25. Bearing sleeves 56 of Teflon or the like are disposed between the bearing openings and the stems 26 and 27. The O-rings 54 are on the inner ends of these sleeves so that they not only contain line pressure, but also protect the sleeves against contamination.

The stem 26 projects outwardly from bearing opening 26a so that its outer end may be manipulated by a suitable tool in rotating the closure member between opened and closed positions, and cooperating parts are formed on such end and the second body 16 for locating the closure member in its opened and closed positions. For this purpose, and as best shown in FIG. 3, a plate 58 is slipped over the upper end of stem 26 and held down against the top of bearing 21 by means of pins 57. More particularly, the stem is out-of-round to receive a similarly shaped hole 58a in the plate so as to hold it in a predetermined rotational position with respect to the stem. In this way, shoulders on opposite ends of an arcuate recess 58b about the plate are spaced 90° apart for alternately engaging a pin 59 projecting upwardly from the top of the bearing in the opened and closed positions of the closure member.

In the use of this valve 10, the first body 11 is connected in the conduit 15, either with or without the second body 16 and the expendable parts carried thereby. In the event the second body is not so mounted, it is moved with the expendable parts into the opening 13 of valve body 11 so as to bring the hole in the lug 19 into alignment with the holes in the ears 18 on the first valve body. Then, upon movement of the pin 18a through the aligned holes, the valve is fully assembled and ready for operation in the manner described.

In order to assemble the expendable parts within the valve body 16, the larger stem 26 is first moved through its bearing opening 26a, and the shorter stem then moved through its bearing opening 27a. Both stems are then rotated to positions to align the flanges thereon with the axis of the cylindrical opening 17. The pins 43 and 47 are backed out as as to withdraw their inner ends and the ball 25 is turned to align the grooves 40 therein with the flanges on the inner ends of the stems. The ball is then moved laterally into the opening 17 so as to slide the grooves 40 over the flanges until the holes 46 and 50 extending radially inwardly from the grooves 40 are disposed beneath the pins 43 and 47, respectively. The pins can then be threaded inwardly to move their inner ends into the holes and thereby fixedly locate the ball 25 laterally with respect to the stems.

The seats 28 are then moved into place on opposite sides of the ball 25, and are held thereagainst as the second valve body is moved laterally into the opening 13. As previously described, the chamfers 36 and 37 on the seats and second valve body cooperate with the chamfers 35 at the first valve body to guide the second valve body and the expendable parts into place. When the second body is properly located in opening 13, it is held therein by insertion of pin 18a.

In the event it is necessary to repair or replace one of the expendable parts, only the pin 18a need be removed and the second valve body 16 lifted from within the opening 14. This permits the operator to replace or repair the seats 28 by merely moving them laterally outwardly from the second body opening 17. Also, of course, the ball 25 itself may be repaired or replaced merely by backing out the stems 43 and 47 to permit grooves 40 to be moved out of the flanges 41 and 42.

This removal of the ball 25 from its releasable connection with the stems 26 and 27 also permits the stems to be moved inwardly to provide access to the O-rings 54, metal rings 53 and bearing sleeves 56, whereby they may be replaced, if desired. It will also be noted in this respect that the pins 57 are removable from the sides of the stem 26 so as to permit such stem to be moved inwardly in this manner. Still further, with the ball 25 removed, the pins 43 and 47 of the stems may be moved inwardly to a position beneath the inner ends of the flanges 41 and 42 a sufficient distance to permit replacement or repair of the O-rings 51 and 52.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what I claim is:

1. A valve, comprising a first body having a flowway extending therethrough and a first opening extending across the flowway, a second body removably and slidably inserted into the first opening and having a second opening aligned with the flowway, means on the bodies for holding them with the second opening aligned with the flowway, a closure member carried in said second opening for movement between flowway opening and closing positions, and a seat in the second opening for sealing between the bodies and the member when the closure member is in flowway closing position, said seat including a relatively rigid core which has a port aligned with the flowway and carries resilient sealing means, said core having a first surface confronting a wall of the first opening, a second surface confronting a wall of the second opening, and a third surface confronting the closure member, and said resilient sealing means having a first portion which sealably engages the wall of the first opening about the flowway and is constrained by said first surface and first opening wall against fluid pressure induced deformation between them in a direction toward the intersection of said first and second surfaces, a second portion which sealably engages the wall of the second opening and is constrained by said second surface and second opening wall against fluid pressure induced deformation between them in a direction toward said intersection, the sealing area subtended by the second portion being larger than that subtended by the first portion, and a third portion which engages the closure member, said third portion being constrained by said third surface and closure member against fluid pressure induced deformation between them in a direction toward the intersection of said third surface and port to seal against said closure member when fluid pressure acting over the second and third sealing portions exceeds that within the port, and being sufficiently unconstrained against fluid pressure induced deformation in a direction away from the intersection of said third surface and port to permit fluid to bypass said third portion when fluid pressure within the port exceeds that acting over said second and third sealing portions.

2. A valve of the character described in claim 1, wherein the closure member has means on its opposite ends for guiding said member during movement between flowway opening and closing positions.

3. A valve, comprising a first body having a flowway therethrough and an opening extending across the flowway, a second body removably and slidably inserted into the first body opening and having an opening therethrough, means on the bodies for holding the second body within the first body opening with the opening in the second body aligned with the flowway, a closure member in the second body opening, means mounting the closure member on the second body for movement between positions opening and closing the flowway, and a seat carried within the opening of the second body between each side of the closure member and an adjacent side of the first body opening surrounding the intersection of the flowway therewith, each said seat including a relatively rigid core which has a port therethrough and resilient sealing means on the core, said sealing means including a first portion sealably engaged with said adjacent side of the first body opening and constrained by said core and said side of the first body opening against fluid pressure induced deformation between the core and said side in a direction toward said second body opening, a second portion sealably engaged with a wall of the opening through the second body and constrained by said core and wall of the second body opening against fluid pressure induced deformation between said core and second body opening wall in a direction toward the adjacent side of the first body opening, the sealing area subtended by the first sealing portion being greater than that subtended by the second sealing portion, and a third portion engaged with the closure member in its flowway-closing position, said third portion of the sealing means being constrained by said core and closure member against fluid pressure induced deformation toward the port to seal against said closure member when fluid pressure acting over the second and third sealing portions exceeds that within the port, and being sufficiently unconstrained against fluid pressure induced deformation away from the intersection of said third surface and port to permit fluid to bypass said third portion when fluid pressure within the port exceeds that acting over said second and third sealing portions.

4. A valve of the character described in claim 3, wherein the means for mounting the closure member comprises means on its opposite ends mounted in the second body for guiding said member during movement between flowway opening and closing positions.

5. A valve of the character described in claim 3, wherein the closure member comprises a ball having a port therethrough, the means for mounting the ball comprises a stem releasably connected to each end thereof, and the second body includes a one-piece portion through which the opening through said second body extends, said one-piece portion having bearings in which the stems are rotatably mounted.

6. A valve of the character described in claim 5, wherein there is a groove extending entirely across each side of the ball in a direction parallel to the axis of the port therethrough, a part on the inner end of each stem for sliding within the groove, a pin extending within each stem for movement longitudinally thereof, and an opening in each groove to closely receive the inner end of the pin as the pin is moved into it.

7. A valve seat for a ball valve, comprising a relatively rigid ring having a port therethrough, a first face transverse to the port and having an annular groove therein, and a second face generally opposite to the first face, a first seal ring of resilient material carried within the groove and projecting from said first face, and a second seal ring of resilient material carried on the rigid ring at the radially outer portion of the second face thereof and having radially inner and outer lips, the outer lip projecting radially outwardly from the outer diameter of the rigid ring and subtending an area larger than the area subtended by the outer diameter of the first seal ring, the radially inner portion of said second face of the rigid ring tapering toward the inner diameter of said rigid ring and said first face, and the inner lip of said second seal ring projecting from said tapering portion.

8. A valve seat of the character described in claim 7, wherein there are holes extending through the rigid ring from said groove to said radially outer portion of said second face, and said first and second seal rings are molded to the rigid ring and connected to one another by resilient material sealing said holes.

9. A subassembly for a ball valve, comprising a ball having a port therethrough and grooves extending entirely across opposite outer portions of the ball, each groove having spaced-apart sides extending generally parallel to the axis of the port, an undercut along each side of the groove, and an opening in a midportion of the bottom of each groove.

10. A subassembly of the character described in claim 9, including a pair of stems each having an overhanging portion on opposite sides of one end thereof for fitting within the undercuts in one of the grooves in said ball and a pin longitudinally movable through each stem so as to move its inner end into and out of the opening in said groove.

11. A ball valve seat, comprising a relatively rigid core having a port therethrough, first and second sides generally transverse to said port, and a cylindrical, outer peripheral surface intersecting said second side, said first side having a first surface flaring outwardly from the port in a direction away from said second side and a second surface intersecting the first surface and extending generally radially outwardly therefrom, sealing means on the second side of the core surrounding the port and surrounded by a portion of said second side and having an outer diameter less than the diameter of the peripheral surface of the core, sealing means carried by the core at said peripheral surface, spaced from said second side and having an outer diameter greater than the diameter of the peripheral surface of the core, and one-way interference sealing means carried by the core adjacent said intersection of the first and second surfaces of the first side of the core for sealing against flow through the port toward said second side while permitting flow toward the first side.

12. A seat for a rotary type valve, comprising a relatively rigid core having a port therethrough, first and second sides generally transverse to said port, and a cylindrical, outer peripheral surface intersecting said second side, said first side having a first surface flaring outwardly from the port throughout substantially its entire circumference and in a direction away from said second side and a second surface intersecting the first surface and extending generally radially outwardly therefrom, sealing means on the second side of the core surrounding the port and surrounded by a portion of said second side and having an outer diameter less than the diameter of the peripheral surface of the core, sealing means carried by the core at said peripheral surface, spaced from said second side and having an outer diameter greater than the diameter of the peripheral surface of the core, and one-way interference sealing means carried by the core adjacent said intersection of the first and second surfaces of the first side of the core for sealing against flow through the port toward said second side while permitting flow toward the first side.